United States Patent
Raghoebardajal et al.

(10) Patent No.: US 10,996,757 B2
(45) Date of Patent: May 4, 2021

(54) METHODS AND APPARATUS FOR GENERATING HAPTIC INTERACTION FOR VIRTUAL REALITY

(71) Applicant: Sony Interactive Entertainment Inc., Tokyo (JP)

(72) Inventors: Sharwin Winesh Raghoebardajal, London (GB); Simon Mark Benson, London (GB)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 16/488,052

(22) PCT Filed: Feb. 20, 2018

(86) PCT No.: PCT/GB2018/050436
§ 371 (c)(1),
(2) Date: Aug. 22, 2019

(87) PCT Pub. No.: WO2018/154284
PCT Pub. Date: Aug. 30, 2018

(65) Prior Publication Data
US 2019/0384404 A1    Dec. 19, 2019

(30) Foreign Application Priority Data
Feb. 24, 2017 (GB) .................................. 1703013

(51) Int. Cl.
*G09G 5/00*        (2006.01)
*G06F 3/01*        (2006.01)
(Continued)

(52) U.S. Cl.
CPC ............ *G06F 3/016* (2013.01); *A63F 13/211* (2014.09); *A63F 13/212* (2014.09);
(Continued)

(58) Field of Classification Search
CPC .......... G02B 27/01; G06F 3/033; G09G 5/08; G09G 5/00; G02F 1/133
See application file for complete search history.

(56) References Cited

U.S. PATENT DOCUMENTS

| 7,084,884 B1 | 8/2006 | Nelson |
| 2008/0204425 A1 | 8/2008 | Nagasaka |

(Continued)

FOREIGN PATENT DOCUMENTS

| EP | 1452949 A1 | 9/2004 |
| EP | 2921938 A1 | 9/2015 |

(Continued)

OTHER PUBLICATIONS

International Search Report and Written Opinion for corresponding PCT Application No. PCT/GB2018/050436, 16 pages, dated May 2, 2018.

(Continued)

*Primary Examiner* — Pegeman Karimi
(74) *Attorney, Agent, or Firm* — Matthew B. Dernier, Esq.

(57) ABSTRACT

Virtual reality apparatus includes a display generator to generate images of a virtual environment, including a virtual representation of a display object and at least part of an avatar, for display to a user; a haptic interface including one or more actuators to provide a physical interaction with the user in response to a haptic interaction signal; a detector arrangement configured to detect two or more haptic detections applicable to a current configuration of the avatar relative to the object in the virtual environment; and a haptic generator to generate the haptic interaction signal in dependence upon the two or more haptic detections.

25 Claims, 13 Drawing Sheets

(51) Int. Cl.
A63F 13/211 (2014.01)
A63F 13/212 (2014.01)
A63F 13/285 (2014.01)
G06F 3/16 (2006.01)

(52) U.S. Cl.
CPC ............ *A63F 13/285* (2014.09); *G06F 3/014* (2013.01); *G06F 3/16* (2013.01)

(56) References Cited

U.S. PATENT DOCUMENTS

| | | |
|---|---|---|
| 2009/0282331 A1 | 11/2009 | Nagasaka |
| 2010/0035726 A1 | 2/2010 | Fisher |
| 2014/0085414 A1* | 3/2014 | Zhou ........................ G06F 3/011 348/43 |
| 2016/0274662 A1* | 9/2016 | Rimon ..................... G06F 3/016 |
| 2017/0345219 A1* | 11/2017 | Holz ........................ G06F 3/147 |
| 2018/0300897 A1* | 10/2018 | Woods ................... G06F 3/0484 |

FOREIGN PATENT DOCUMENTS

| | | |
|---|---|---|
| EP | 2942693 A1 | 11/2015 |
| WO | 2016053789 A1 | 4/2016 |
| WO | 2016186932 A1 | 11/2016 |

OTHER PUBLICATIONS

Combined Search and Examination Report for corresponding GB Application No. 1703013.1, 5 pages, dated Aug. 8, 2017.
Examination Report for corresponding GB Application No. 1703013.1, 3 pages, dated Feb. 28, 2020.

* cited by examiner

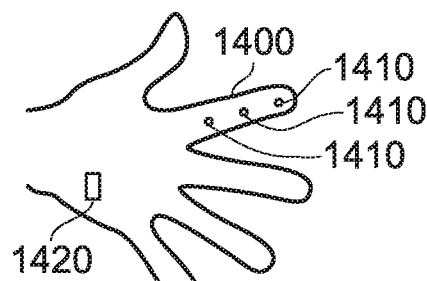
FIG. 14
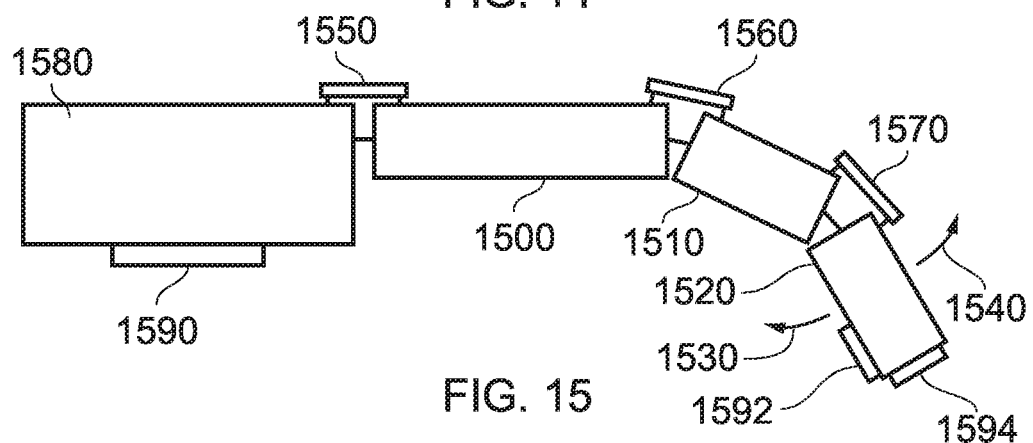
FIG. 15
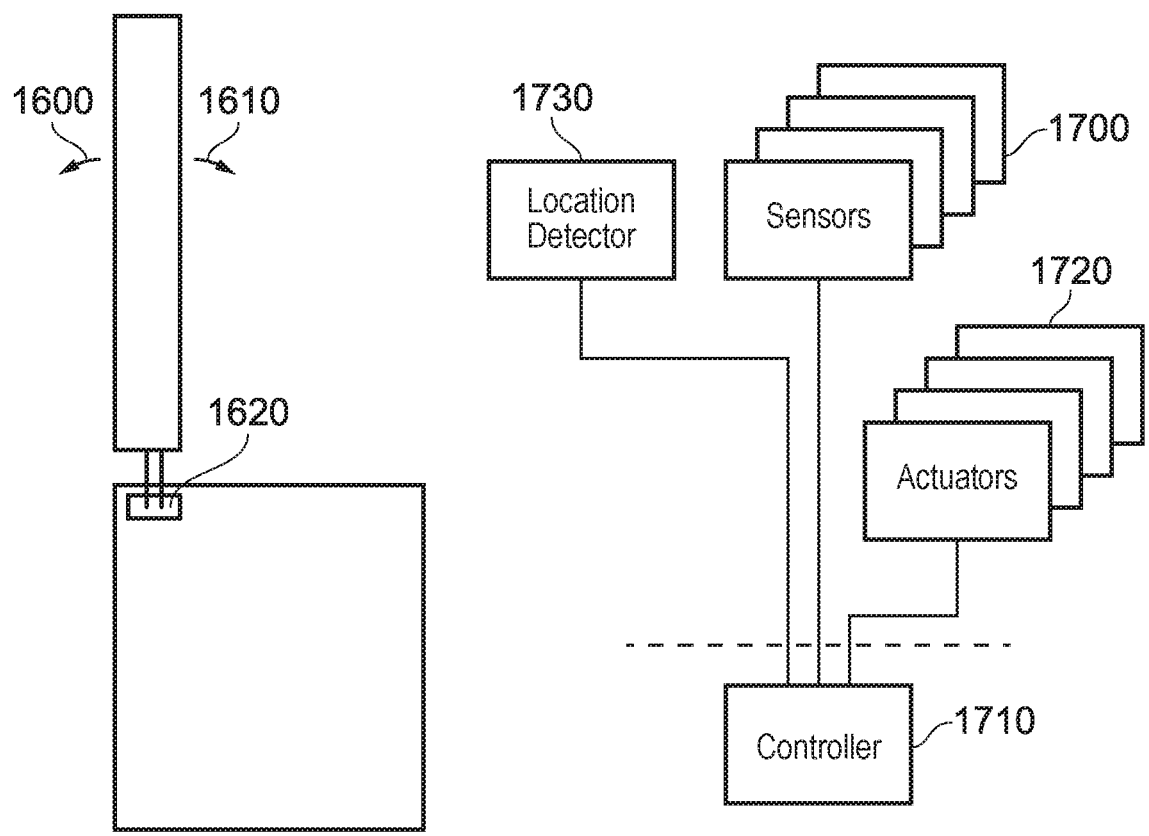
FIG. 16
FIG. 17

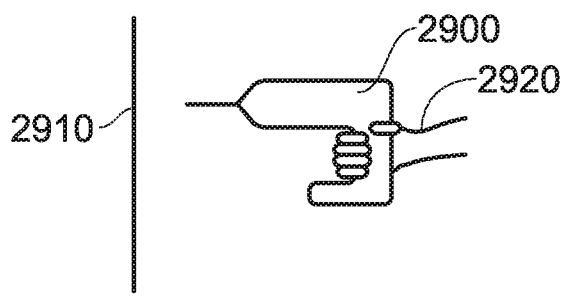
FIG. 21
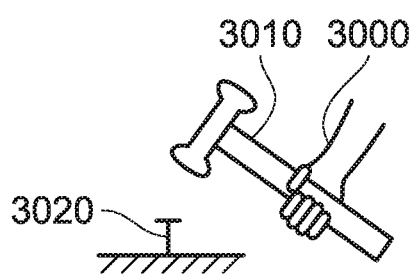
FIG. 22
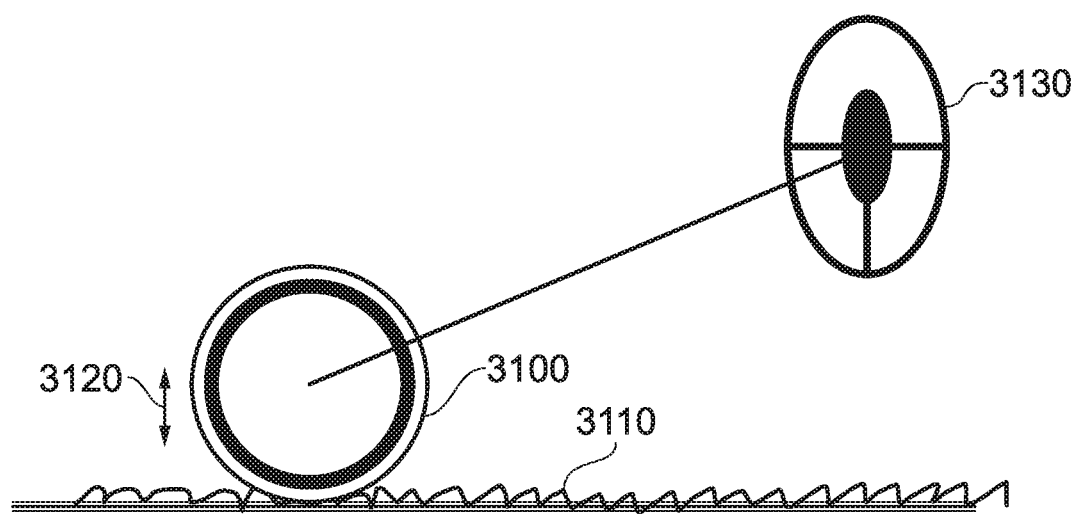
FIG. 23
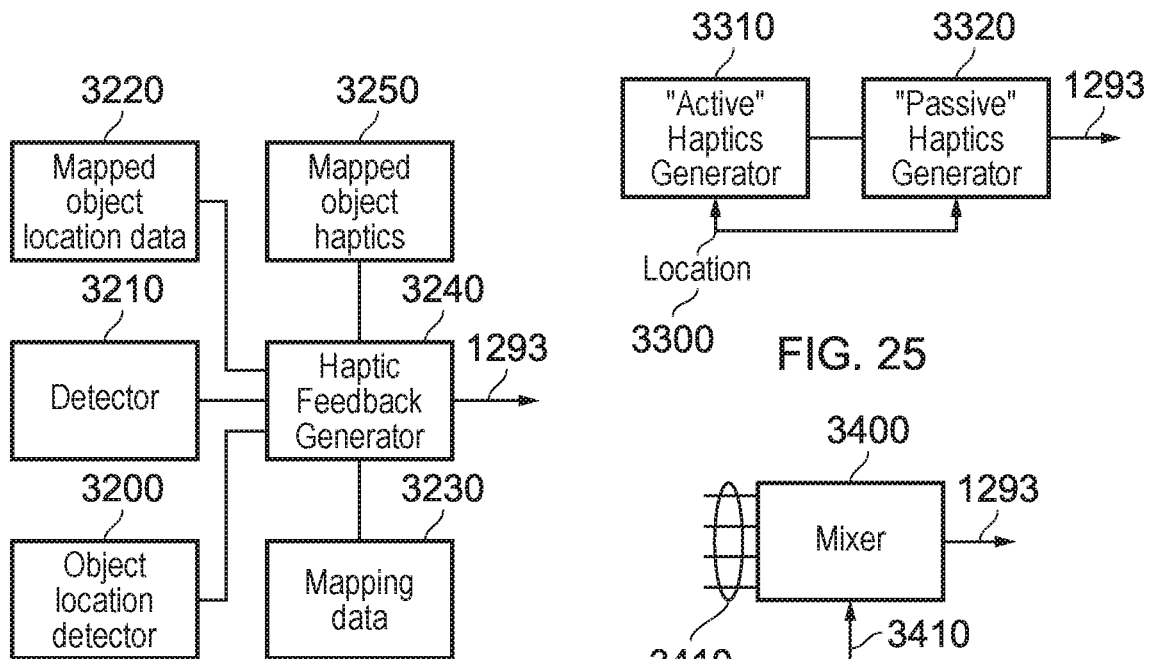
FIG. 24
FIG. 25
FIG. 26

METHODS AND APPARATUS FOR GENERATING HAPTIC INTERACTION FOR VIRTUAL REALITY

BACKGROUND

Field of the Disclosure

This disclosure relates to virtual reality systems and methods.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

A head-mountable display (HMD) is one example of a head-mountable apparatus for use in a virtual reality system in which an HMD wearer views a virtual environment. In an HMD, an image or video display device is provided which may be worn on the head or as part of a helmet. Either one eye or both eyes are provided with small electronic display devices.

It has been proposed to provide so-called haptic feedback or interaction to a user, such as a user viewing a virtual world (for example via an HMD). This can involve providing non-visual and non-auditory sensory interaction with the user, for example via one or more actuators configured to stimulate the user's sense of touch.

Although the original development of HMDs and virtual reality was perhaps driven by the military and professional applications of these devices, HMDs are becoming more popular for use by casual users in, for example, computer game or domestic computing applications.

The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY

An example embodiment provides virtual reality apparatus comprising:
a display generator to generate images of a virtual environment, including a virtual representation of a display object and at least part of an avatar, for display to a user;
a haptic interface comprising one or more actuators to provide a physical interaction with the user in response to a haptic interaction signal;
a detector arrangement configured to detect two or more haptic detections applicable to a current configuration of the avatar relative to the object in the virtual environment; and
a haptic generator to generate the haptic interaction signal in dependence upon the two or more haptic detections.

Another example embodiment provides virtual reality apparatus comprising:

a display generator to generate images of a virtual environment, including a virtual representation of a display object and at least part of an avatar, for display to a user;

a detector arrangement configured to detect two or more haptic detections applicable to a current configuration of the avatar relative to the object in the virtual environment; and a haptic generator to generate a haptic interaction signal, to control a haptic interface comprising one or more actuators to provide a physical interaction with the user in response to a haptic interaction signal, in dependence upon the two or more haptic detections.

Another example embodiment provides a virtual reality apparatus comprising:
a display generator to generate images of a virtual environment, including a virtual representation of a display object and at least part of an avatar, for display to a user;
a haptic interface comprising one or more actuators to provide a physical interaction with the user in response to a haptic interaction signal; and
a haptic generator to generate the haptic interaction signal in response to a configuration of the avatar relative to the object in the virtual environment;
in which the haptic generator is configured to detect an avatar contact region of the avatar touching the object, and generate the haptic interaction signal in dependence upon:
simulated haptic interaction of a second object relative to the display object in the virtual environment; and
a simulated propagation path between the display object and the second object in the virtual environment.

Another example embodiment provides a virtual reality apparatus comprising:
a display generator to generate images of a virtual environment, including a virtual representation of a display object and at least part of an avatar, for display to a user;
a haptic generator to generate the haptic interaction signal in response to a configuration of the avatar relative to the object in the virtual environment;
in which the haptic generator is configured to detect an avatar contact region of the avatar touching the object, and generate the haptic interaction signal in dependence upon:
simulated haptic interaction of a second object relative to the display object in the virtual environment; and
a simulated propagation path between the display object and the second object in the virtual environment.

Another example embodiment provides a method comprising:
generating images of a virtual environment, including a virtual representation of a display object and at least part of an avatar, for display to a user;
generating a haptic interaction signal in response to a configuration of the avatar relative to the object in the virtual environment, by detecting an avatar contact region of the avatar touching the object, and generating the haptic interaction signal in dependence upon:
simulated haptic interaction of a second object in the virtual environment; and
a simulated propagation path between the display object and the second object in the virtual environment; and
providing a physical interaction with the user in response to a haptic interaction signal.

Another example embodiment provides a method comprising:
generating images of a virtual environment, including a virtual representation of a display object and at least part of an avatar, for display to a user; and
generating a haptic interaction signal in response to a configuration of the avatar relative to the object in the virtual environment, by detecting an avatar contact region of the avatar touching the object, and generating the haptic interaction signal in dependence upon:

simulated haptic interaction of a second object in the virtual environment; and a simulated propagation path between the display object and the second object in the virtual environment.

Another example embodiment provides a method comprising:

generating images of a virtual environment, including a virtual representation of a display object and at least part of an avatar, for display to a user;

detecting two or more haptic detections applicable to a current configuration of the avatar relative to the object in the virtual environment;

generating a haptic interaction signal in dependence upon the two or more haptic detections; and providing, by a haptic interface comprising one or more actuators, a physical interaction with the user in response to a haptic interaction signal.

Another example embodiment provides a method comprising:

generating images of a virtual environment, including a virtual representation of a display object and at least part of an avatar, for display to a user;

detecting two or more haptic detections applicable to a current configuration of the avatar relative to the object in the virtual environment; and generating a haptic interaction signal, to control a haptic interface comprising one or more actuators to provide a physical interaction with the user in response to a haptic interaction signal, in dependence upon the two or more haptic detections.

Example embodiments provide computer software which, when executed by a computer, causes the computer to perform the steps of any one of the methods defined above.

Example embodiments provide a machine-readable, non-transitory storage medium which stores such computer software.

Various other aspects and features of the present disclosure are defined in the appended claims and within the text of the accompanying description and include at least a head mountable apparatus such as a display and a method of operating a head-mountable apparatus as well as a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 14 schematically illustrates a haptic glove;

FIGS. 15 and 16 schematically illustrate sensors and actuators;

FIG. 17 schematically illustrates operations of a haptic glove;

FIGS. 21-23 schematically illustrate examples of display objects;

FIG. 24 schematically illustrates example operations of a haptic generator;

FIG. 25 schematically illustrates example operations of a haptic generator;

FIG. 26 schematically illustrates example operations of a haptic generator.

DESCRIPTION OF THE EMBODIMENTS

Figure 1:
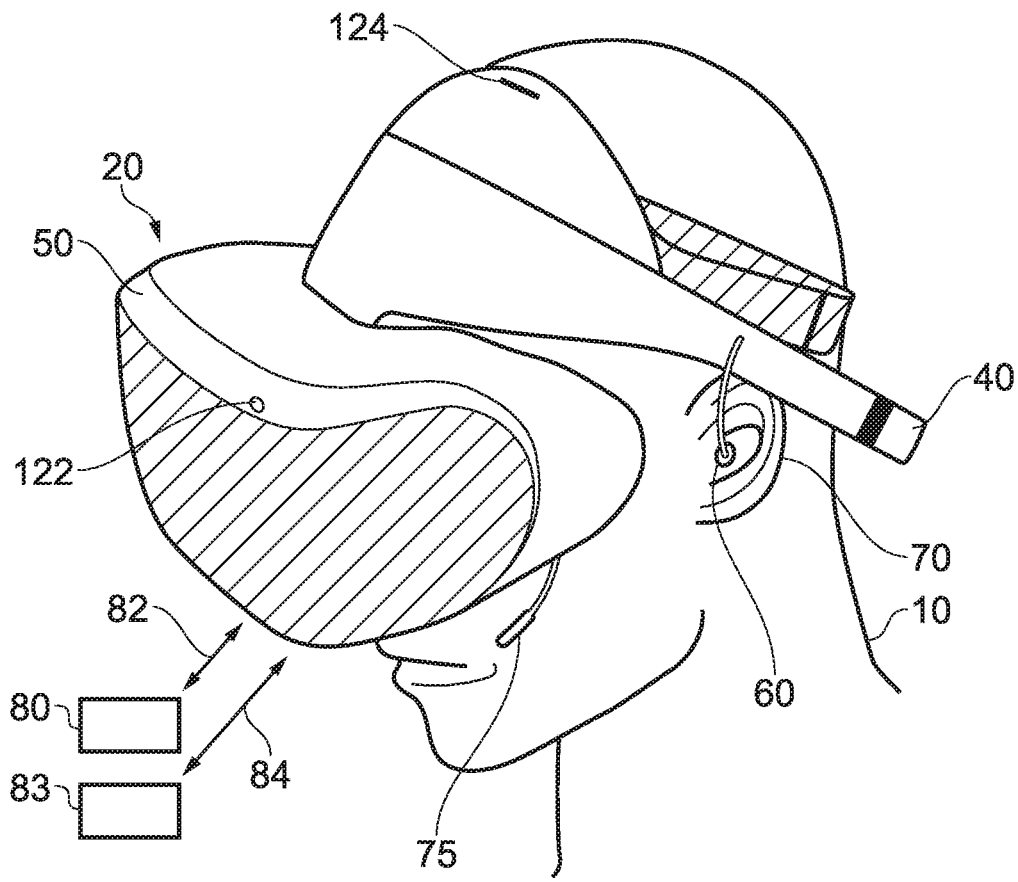
FIG. 1 schematically illustrates an HMD worn by a user.

Referring now to FIG. 1, a user 10 is wearing an HMD 20 (as an example of a generic head-mountable apparatus or virtual reality apparatus). The HMD comprises a frame 40, in this example formed of a rear strap and a top strap, and a display portion 50.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD.

The HMD has associated headphone audio transducers or earpieces 60 which fit into the user's left and right ears 70. The earpieces 60 replay an audio signal provided from an external source, which may be the same as the video signal source which provides the video signal for display to the user's eyes. A boom microphone 75 is mounted on the HMD so as to extend towards the user's mouth.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. A Bluetooth® antenna 124 may provide communication facilities or may simply be arranged as a directional antenna to allow a detection of the direction of a nearby Bluetooth transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection 82. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply 83 (including one or more batteries and/or being connectable to a mains power outlet) may be linked by a cable 84 to the HMD. Note that the power supply 83 and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the disclosure are applicable to an HMD having at least one electrical and/or optical cable linking the HMD to another device, such as a power supply and/or a video (and/or audio) signal source. So, embodiments of the disclosure can include, for example:

(a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply;

(d) an HMD having a wireless connection to a video and/or audio signal source and a cabled connection to a power supply; or (e) an HMD having its own video and/or audio signal source and its own power supply (both as part of the HMD arrangement).

If one or more cables are used, the physical position at which the cable 82 and/or 84 enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables 82, 84 relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
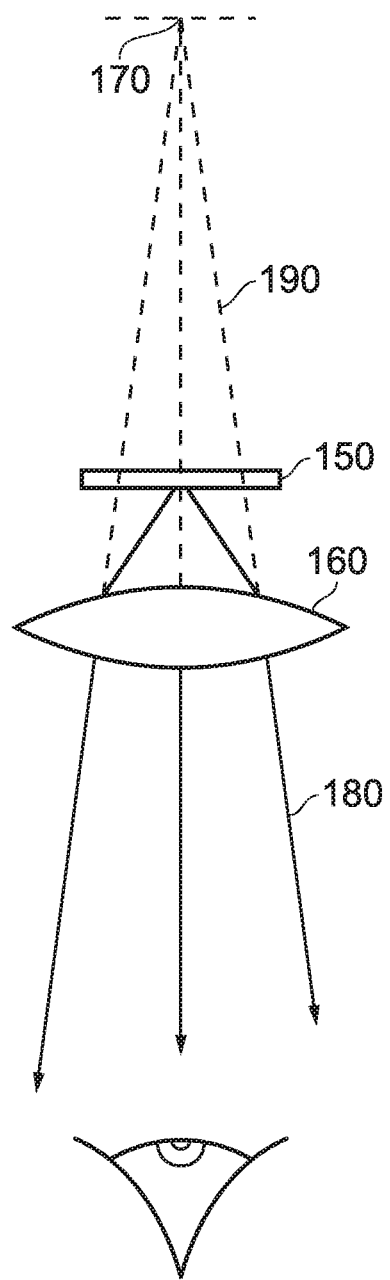
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
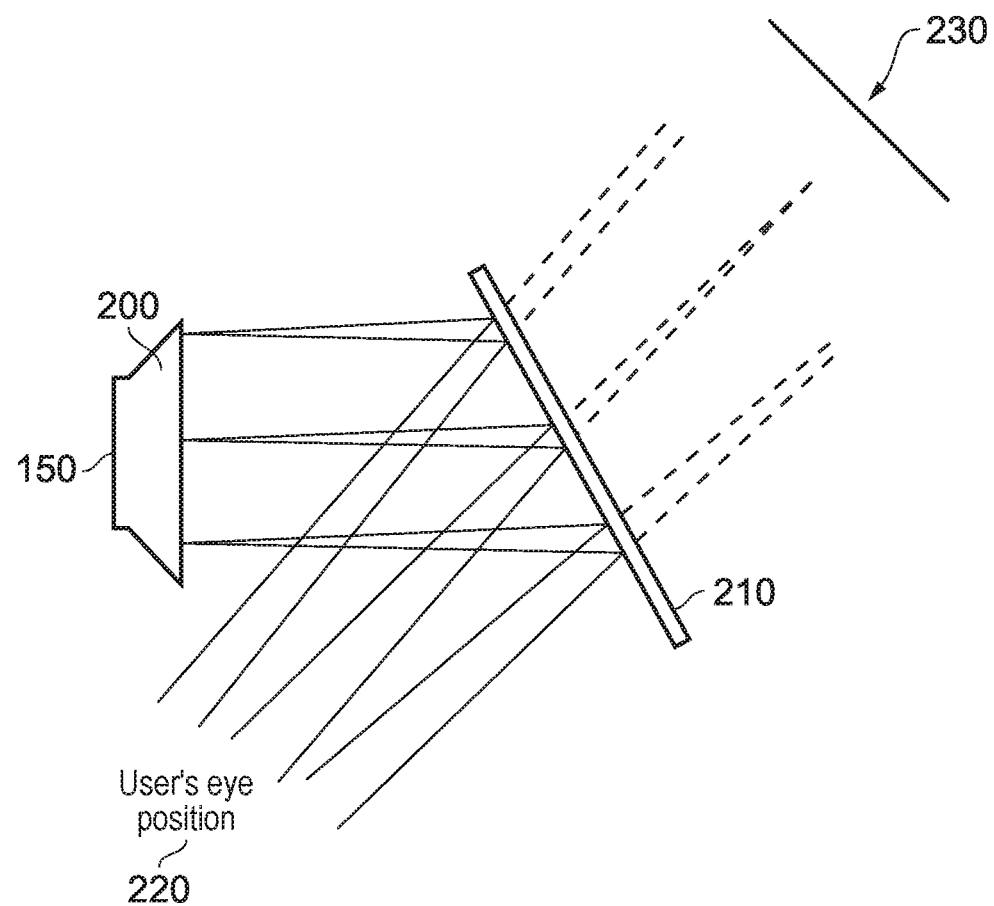
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

Figure 6:
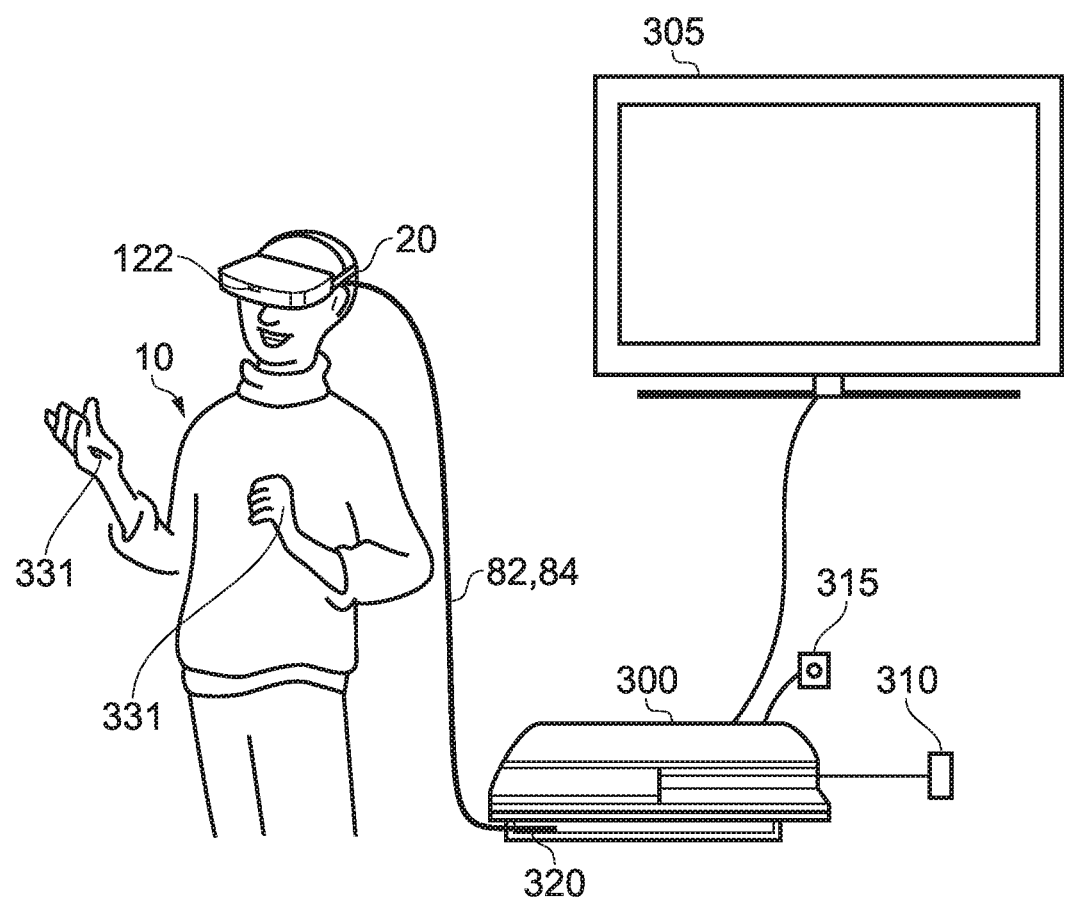
FIGS. 6 and 7 schematically illustrate a user wearing an HMD connected to a Sony® PlayStation 3® games console.

FIG. 6 schematically illustrates an example virtual reality system and in particular shows a user wearing an HMD connected to a Sony® PlayStation 3® games console 300 as an example of a base device. The games console 300 is connected to a mains power supply 310 and (optionally) to a main display screen (not shown). A cable, acting as the cables 82, 84 discussed above (and so acting as both power supply and signal cables), links the HMD 20 to the games console 300 and is, for example, plugged into a USB socket 320 on the console 300. Note that in the present embodiments, a single physical cable is provided which fulfils the functions of the cables 82, 84.

The video displays in the HMD 20 are arranged to display images generated by the games console 300, and the earpieces 60 in the HMD 20 are arranged to reproduce audio signals generated by the games console 300. Note that if a USB type cable is used, these signals will be in digital form when they reach the HMD 20, such that the HMD 20 comprises a digital to analogue converter (DAC) to convert at least the audio signals back into an analogue form for reproduction.

Images from the camera 122 mounted on the HMD 20 are passed back to the games console 300 via the cable 82, 84. Similarly, if motion or other sensors are provided at the HMD 20, signals from those sensors may be at least partially processed at the HMD 20 and/or may be at least partially processed at the games console 300. The use and processing of such signals will be described further below.

The USB connection from the games console 300 also provides power to the HMD 20, according to the USB standard.

FIG. 6 also shows a separate display 305 such as a television or other openly viewable display (by which it is meant that viewers other than the HMD wearer may see images displayed by the display 305) and a camera 315, which may be (for example) directed towards the user (such as the HMD wearer) during operation of the apparatus. An example of a suitable camera is the PlayStation Eye camera, although more generally a generic "webcam", connected to the console 300 by a wired (such as a USB) or wireless (such as WiFi or Bluetooth) connection.

The display 305 may be arranged (under the control of the games console) to provide the function of a so-called "social screen". It is noted that playing a computer game using an HMD can be very engaging for the wearer of the HMD but less so for other people in the vicinity (particularly if they are not themselves also wearing HMDs). To provide an improved experience for a group of users, where the number of HMDs in operation is fewer than the number of users, images can be displayed on a social screen. The images displayed on the social screen may be substantially similar to those displayed to the user wearing the HMD, so that viewers of the social screen see the virtual environment (or a subset, version or representation of it) as seen by the HMD wearer. In other examples, the social screen could display other material such as information relating to the HMD wearer's current progress through the ongoing computer game. For example, the HMD wearer could see the game environment from a first person viewpoint whereas the social screen could provide a third person view of activities and movement of the HMD wearer's avatar, or an overview of a larger portion of the virtual environment. In these examples, an image generator (for example, a part of the functionality of the games console) is configured to generate some of the virtual environment images for display by a display separate to the head mountable display.

In FIG. 6 the user is wearing one or two so-called haptic gloves 331. These can include actuators to provide haptic feedback to the user, for example under the control of processing carried out by the console 300. They may also provide configuration and/or location sensing as discussed below.

Note that other haptic interfaces can be used, providing one or more actuators and/or one or more sensors. For example, a so-called haptics suit may be worn by the user. Haptic shoes may include one or more actuators and one or more sensors. Or the user could stand on or hold a haptic interface device. The one or more actuators associated with these devices may have different respective frequency responses and available amplitudes of vibration. Therefore in example arrangements to be discussed below the haptic generator can be responsive to attributes defining one or capabilities of the haptic interface. In some examples, an attribute defines a frequency response of the haptic interface. In some examples, an attribute defines a maximum amplitude which may be represented by the haptic interface.

Figure 7:
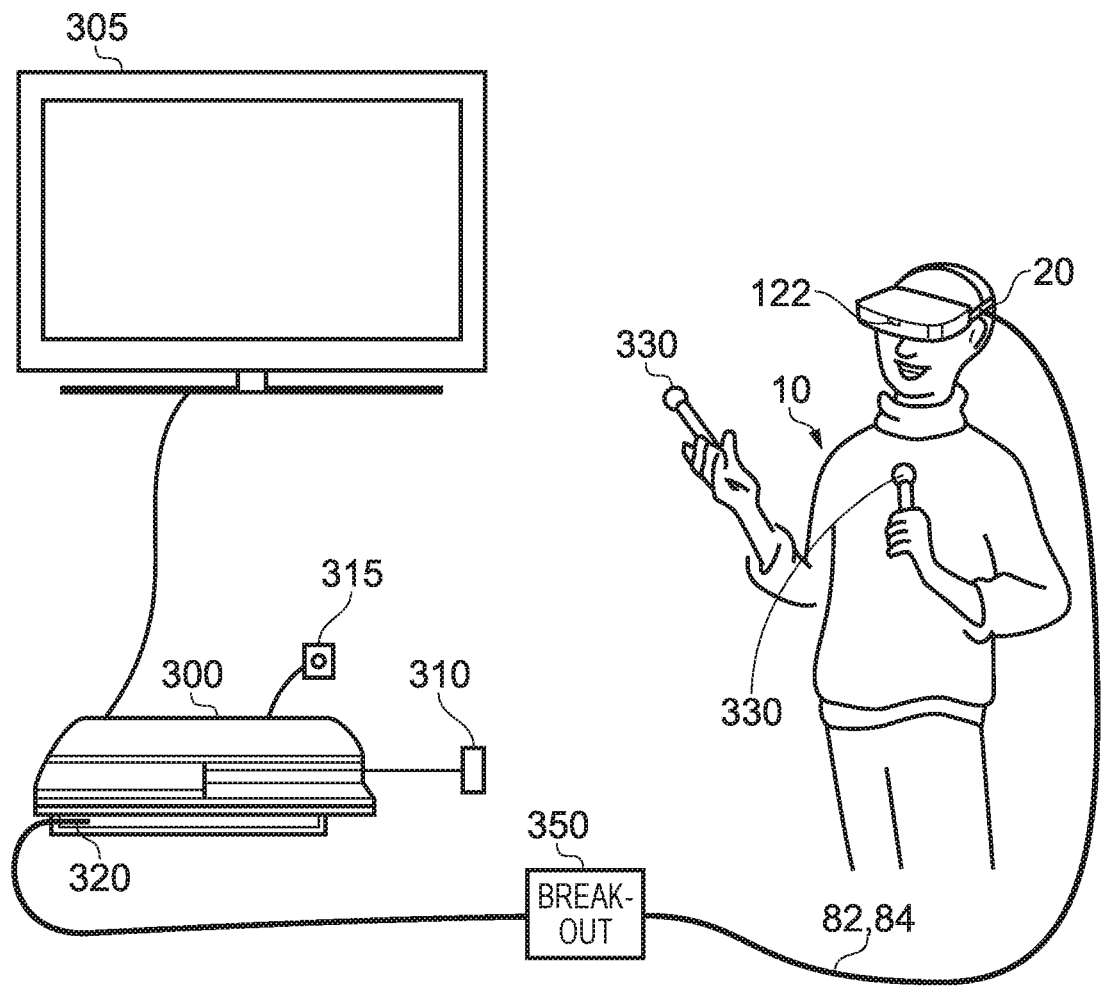

FIG. 7 schematically illustrates a similar arrangement (another example of a virtual reality system) in which the games console is connected (by a wired or wireless link) to a so-called "break out box" acting as a base or intermediate device 350, to which the HMD 20 is connected by a cabled link 82, 84. The breakout box has various functions in this regard. One function is to provide a location, near to the user, for some user controls relating to the operation of the HMD, such as (for example) one or more of a power control, a brightness control, an input source selector, a volume control and the like. Another function is to provide a local power supply for the HMD (if one is needed according to the embodiment being discussed). Another function is to provide a local cable anchoring point. In this last function, it is not envisaged that the break-out box 350 is fixed to the ground or to a piece of furniture, but rather than having a very long trailing cable from the games console 300, the break-out box provides a locally weighted point so that the cable 82, 84 linking the HMD 20 to the break-out box will tend to move around the position of the break-out box. This can improve user safety and comfort by avoiding the use of very long trailing cables.

In FIG. 7, the user is also shown holding a pair of hand-held controller 330s which may be, for example, Sony® Move® controllers which communicate wirelessly with the games console 300 to control (or to contribute to the control of) game operations relating to a currently executed game program. The user may also be wearing one or two haptic gloves as discussed in connection with FIG. 6.

It will be appreciated that the localisation of processing in the various techniques described in this application can be varied without changing the overall effect, given that an HMD may form part of a set or cohort of interconnected devices (that is to say, interconnected for the purposes of data or signal transfer, but not necessarily connected by a physical cable). So, processing which is described as taking place "at" one device, such as at the HMD, could be devolved to another device such as the games console (base device) or the break-out box. Processing tasks can be shared amongst devices. Source signals, on which the processing is to take place, could be distributed to another device, or the processing results from the processing of those source signals could be sent to another device, as required. So any references to processing taking place at a particular device should be understood in this context. Similarly, where an interaction between two devices is basically symmetrical, for example where a camera or sensor on one device detects a signal or feature of the other device, it will be understood that unless the context prohibits this, the two devices could be interchanged without any loss of functionality.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion.

Figure 8:
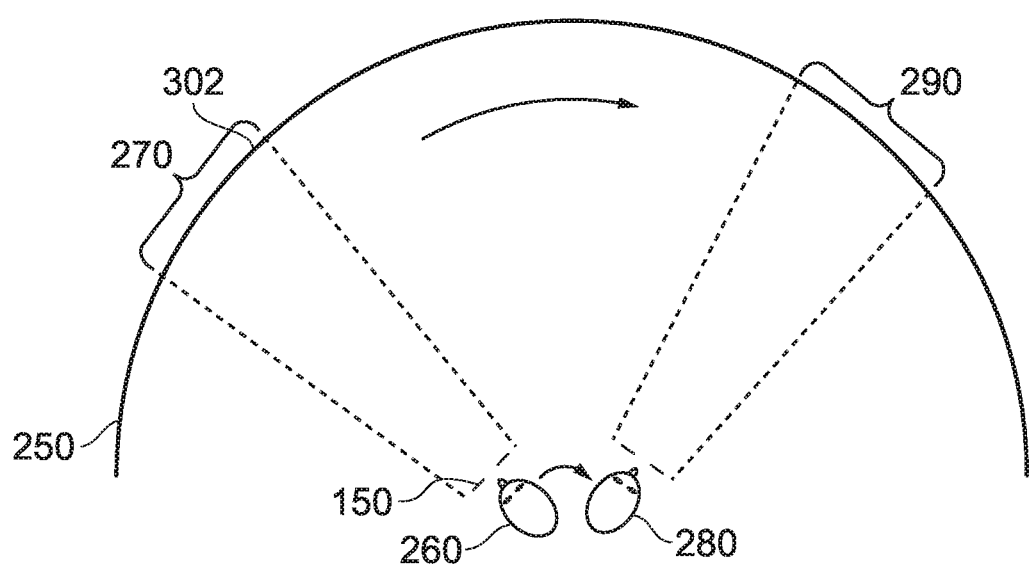
FIG. 8 schematically illustrates a change of view of user of an HMD.

FIG. 8 schematically illustrates the effect of a user head movement in a VR or AR system.

Referring to FIG. 8, a virtual environment is represented by a (virtual) spherical shell 250 around a user. This provides an example of a virtual display screen (VDS). Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display elements 150 of the user's HMD. It can be seen from the drawing that the VDS subsists in three dimensional space (in a virtual sense) around the position in space of the HMD wearer, such that the HMD wearer sees a current portion of VDS according to the HMD orientation.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 is displayed by the HMD.

So, in this arrangement, the apparent viewpoint within the virtual environment moves with the head movement. If the head rotates to the right side, for example, as shown in FIG. 8, the apparent viewpoint also moves to the right from the user's point of view. If the situation is considered from the aspect of a displayed object, such as a displayed object 300, this will effectively move in the opposite direction to the head movement. So, if the head movement is to the right, the apparent viewpoint moves to the right but an object such as the displayed object 300 which is stationary in the virtual environment will move towards the left of the displayed image and eventually will disappear off the left-hand side of the displayed image, for the simple reason that the displayed portion of the virtual environment has moved to the right whereas the displayed object 300 has not moved in the virtual environment.

Figure 2:
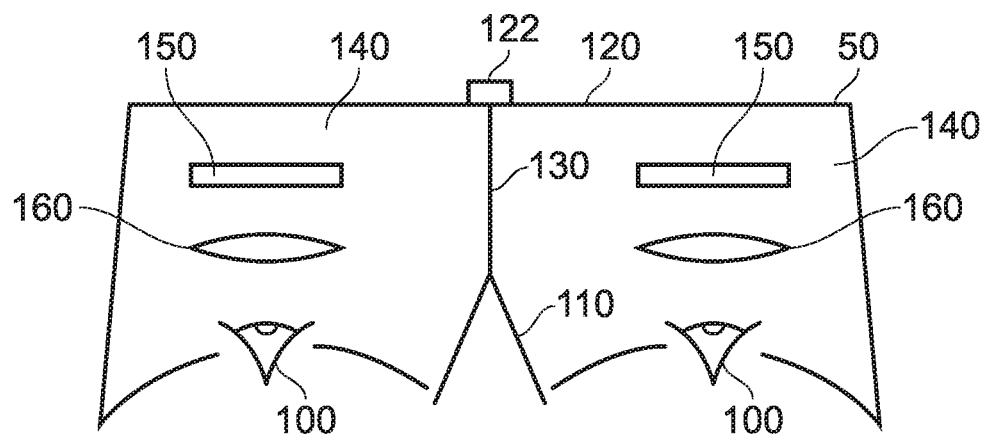
FIG. 2 is a schematic plan view of an HMD.
Figure 9A:
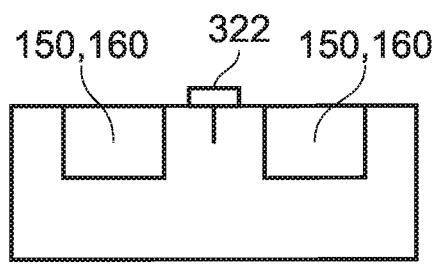
FIGS. 9a and 9b schematically illustrate HMDs with motion sensing.
Figure 9B:
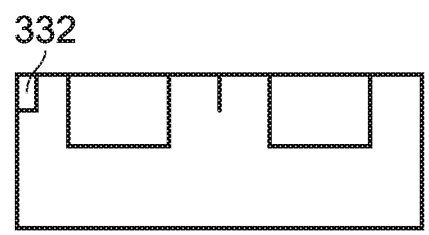

FIGS. 9a and 9b schematically illustrated HMDs with motion sensing. The two drawings are in a similar format to that shown in FIG. 2. That is to say, the drawings are schematic plan views of an HMD, in which the display element 150 and optical elements 160 are represented by a simple box shape. Many features of FIG. 2 are not shown, for clarity of the diagrams. Both drawings show examples of HMDs with a motion detector for detecting motion of the observer's head.

In FIG. 9a, a forward-facing camera 322 is provided on the front of the HMD. This may be the same camera as the camera 122 discussed above, or may be an additional camera. This does not necessarily provide images for display to the user (although it could do so in an augmented reality arrangement). Instead, its primary purpose in the present embodiments is to allow motion sensing. A technique for using images captured by the camera 322 for motion sensing will be described below in connection with FIG. 10. In these arrangements, the motion detector comprises a camera mounted so as to move with the frame; and an image comparator operable to compare successive images captured by the camera so as to detect inter-image motion.

FIG. 9b makes use of a hardware motion detector 332. This can be mounted anywhere within or on the HMD. Examples of suitable hardware motion detectors are piezo-electric accelerometers or optical fibre gyroscopes. It will of course be appreciated that both hardware motion detection and camera-based motion detection can be used in the same device, in which case one sensing arrangement could be used as a backup when the other one is unavailable, or one sensing arrangement (such as the camera) could provide data for changing the apparent viewpoint of the displayed images, whereas the other (such as an accelerometer) could provide data for image stabilisation.

Figure 10:
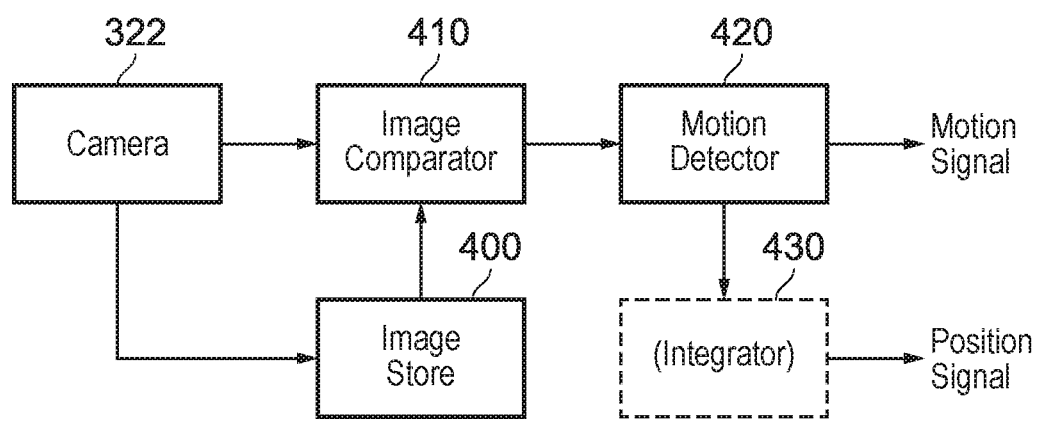
FIG. 10 schematically illustrates a position sensor based on optical flow detection.

FIG. 10 schematically illustrates one example of motion detection using the camera 322 of FIG. 9a.

The camera 322 is a video camera, capturing images at an image capture rate of, for example, 25 images per second. As each image is captured, it is passed to an image store 400 for storage and is also compared, by an image comparator 410, with a preceding image retrieved from the image store. The comparison uses known block matching techniques (so-called "optical flow" detection) to establish whether substantially the whole image has moved since the time at which the preceding image was captured. Localised motion might indicate moving objects within the field of view of the camera 322, but global motion of substantially the whole image would tend to indicate motion of the camera rather than of individual features in the captured scene, and in the present case because the camera is mounted on the HMD, motion of the camera corresponds to motion of the HMD and in turn to motion of the user's head.

The displacement between one image and the next, as detected by the image comparator 410, is converted to a signal indicative of motion by a motion detector 420. If required, the motion signal is converted by to a position signal by an integrator 430.

As mentioned above, as an alternative to, or in addition to, the detection of motion by detecting inter-image motion between images captured by a video camera associated with the HMD, the HMD can detect head motion using a mechanical or solid state detector 332 such as an accelerometer. This can in fact give a faster response in respect of the indication of motion, given that the response time of the video-based system is at best the reciprocal of the image capture rate. In some instances, therefore, the detector 332 can be better suited for use with higher frequency motion detection. However, in other instances, for example if a high image rate camera is used (such as a 200 Hz capture rate camera), a camera-based system may be more appropriate. In terms of FIG. 10, the detector 332 could take the place of the camera 322, the image store 400 and the comparator 410, so as to provide an input directly to the motion detector 420. Or the detector 332 could take the place of the motion detector 420 as well, directly providing an output signal indicative of physical motion.

Other position or motion detecting techniques are of course possible. For example, a mechanical arrangement by which the HMD is linked by a moveable pantograph arm to a fixed point (for example, on a data processing device or on a piece of furniture) may be used, with position and orientation sensors detecting changes in the deflection of the pantograph arm. In other embodiments, a system of one or more transmitters and receivers, mounted on the HMD and on a fixed point, can be used to allow detection of the position and orientation of the HMD by triangulation techniques. For example, the HMD could carry one or more directional transmitters, and an array of receivers associated with known or fixed points could detect the relative signals from the one or more transmitters. Or the transmitters could be fixed and the receivers could be on the HMD. Examples of transmitters and receivers include infra-red transducers, ultrasonic transducers and radio frequency transducers. The radio frequency transducers could have a dual purpose, in that they could also form part of a radio frequency data link to and/or from the HMD, such as a Bluetooth® link.

Figure 11:
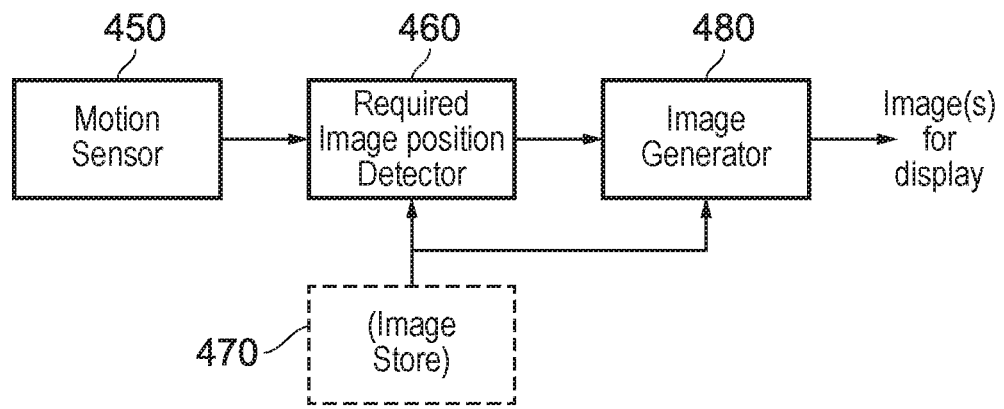
FIG. 11 schematically illustrates image processing carried out in response to a detected position or change in position of an HMD.

FIG. 11 schematically illustrates image processing carried out in response to a detected position or change in position of the HMD.

As mentioned above in connection with FIG. 10, in some applications such as virtual reality and augmented reality arrangements, the apparent viewpoint of the video being displayed to the user of the HMD is changed in response to a change in actual position or orientation of the user's head.

With reference to FIG. 11, this is achieved by a motion sensor 450 (such as the arrangement of FIG. 10 and/or the motion detector 332 of FIG. 9b) supplying data indicative of motion and/or current position to a required image position detector 460, which translates the actual position of the HMD into data defining the required image for display. An image generator 480 accesses image data stored in an image store 470 if required, and generates the required images from the appropriate viewpoint for display by the HMD. The external video signal source can provide the functionality of the image generator 480 and act as a controller to compensate for the lower frequency component of motion of the observer's head by changing the viewpoint of the displayed image so as to move the displayed image in the opposite direction to that of the detected motion so as to change the apparent viewpoint of the observer in the direction of the detected motion.

Figure 12:
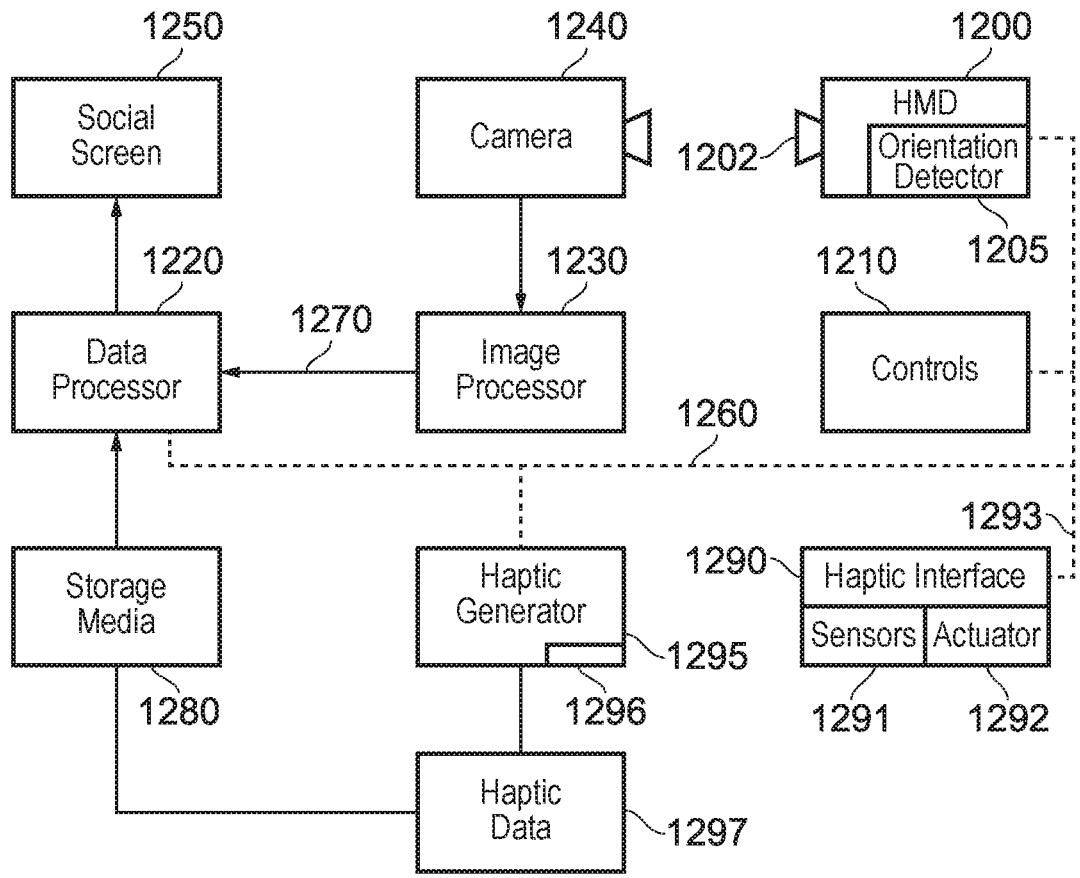
FIG. 12 schematically illustrates a virtual reality system.

FIG. 12 schematically illustrates a virtual reality system or apparatus comprising: an HMD 1200 which may include an orientation detector 1205, for example of the type discussed above with reference to FIGS. 9A-11, one or more user controls 1210, a data processor 1220 such as a game engine, an image processor 1230, a camera 1240 and optionally a social screen 1250 of the type discussed above. Storage media 1280 is optionally provided to store (and to allow retrieval by the data processor of) displayable content and/or game data.

In use, the user wears the HMD 1200 and can operate the one or more controls or controllers 1210. Examples of suitable user controls include the controller 330 shown in FIG. 7 and/or sensors 1291 associated with a haptic interface 1290. The game engine 1220 provides images and other content such as audio content to the HMD via a wired or wireless connection 1260 and receives input from the controllers 1210 via the connection 1260 or via the camera 1240.

The camera 1240 is directed towards the HMD and/or controllers and/or user's hands or other limbs in use. The camera 1240 can therefore capture a current position and/or orientation of the HMD 1200 and a current position and/or orientation of the controllers 1210, each of which is detected from the captured images by the image processor 1230. These captured positions and/or orientations can be used to control data processing operations of the game engine 1220, such as game control operations.

Similarly, the orientation detector 1205 can provide orientation information (such as a data defining a current orientation and/or data defining a detected change in orientation) to the data processor 1220 via the link 1260.

Therefore, in examples, there are various types of control input to the game engine 1220, such as control inputs 1270 derived by the image processor 1230 from captured images captured by the camera 1240 and/or control inputs received from the controls 1210 via the wired or wireless connection 1260. The image processor 1230 provides an example of an image processor to detect, from one or more images captured by the camera 1240, one or more of: (i) a current orientation of the HMD 1200; and (ii) a current location of the HMD 1200. The game engine 1220 provides an example of a data processor to direct a data processing function according to the detection by the image processor. In some examples, the data processing function is a gameplay function.

The haptic interface 1290 receives data from, and provides data to, the data processor 1220 and/or a haptic generator 1295. The haptic interface comprises zero or more sensors 1291 along with one or more actuators 1292. The actuators are responsive to a haptic interaction signal 1293 received from the haptic generator 1295.

The haptic generator 1295 is responsive to haptic data 1297 which may be predetermined and stored, or generated from other data such as graphical texture data (for example, provided by the storage media 1280). The haptic generator 1295 may comprise a filter 1296. Operations of the haptic generator will be discussed in detail below. But in general terms, these arrangements provide examples of virtual reality apparatus (FIG. 12) comprising: a display generator 1220 to generate images of a virtual environment, including a virtual representation of an object and at least part of an avatar, for display to a user, the object having associated graphical texture data (for example in the storage media 1280) for rendering a surface appearance of the object; a haptic interface 1290 comprising one or more actuators 1292 to provide a physical interaction with the user in response to a haptic interaction signal 1293; and a haptic generator 1297 to generate the haptic interaction signal in response to a configuration of the avatar relative to the object in the virtual environment.

FIG. 12 therefore provides an example of virtual reality apparatus comprising:

a display generator 1220 to generate images of a virtual environment, including a virtual representation of a display object and at least part of an avatar, for display to a user; and a haptic interface 1290 comprising one or more actuators to provide a physical interaction with the user in response to a haptic interaction signal.

Figure 13:
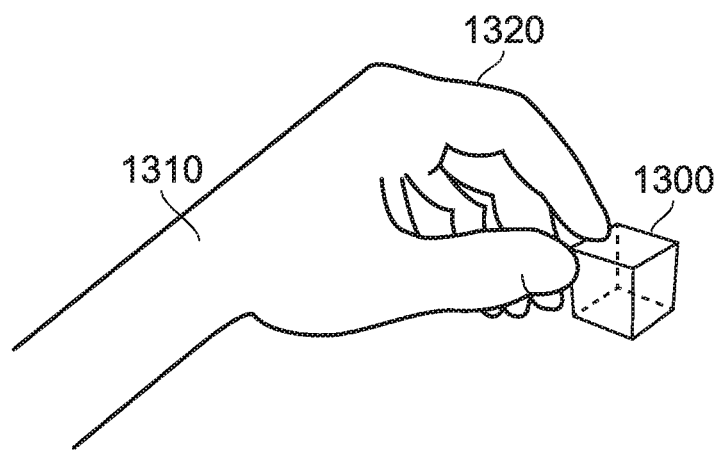
FIG. 13 schematically illustrates an example avatar touching a virtual object.

FIG. 13 schematically illustrates an example avatar touching an object.

As part of the operation of the system of FIG. 12, the data processor 1220, acting as a display generator, generates images of a virtual environment. This includes a virtual representation of an object 1300 and at least a part 1310 of an avatar for display to the user via the HMD 1200.

The HMD 1200 is an example of a head mountable display (HMD) to display the images of the virtual environment to the user.

The avatar is a graphical representation of the user (that is to say, the wearer of the HMD). It represents the user in the video game or other virtual environment being displayed. Although in the examples to be discussed here and with reference to FIG. 13, a generally human-shaped avatar is used, the avatar need not be humanoid but could be a representation of an animal, robot or other representation. In some examples, the avatar is a representation of a body having one or more limbs; and the avatar contact region is disposed at or near an extremity of one or more of the limbs.

In some examples, the whole avatar (that is to say, an entire avatar body) may be visible to the user for whom the avatar is a representation. In other examples, only parts of the avatar may be visible. For example, the avatar representation of the user could be a representation of the user's arms and hands, as they would be seen in the real environment from the user's point of view. So, the avatar arms extend generally in front of the user in the view of the virtual environment seen by the user using the HMD 1200.

It may be the case that other users who are currently viewing the same virtual environment may also see the avatar, which is to say that one user may be able to see the avatar representation of another user in the virtual environment. However, the present discussion relates to a user and that user's interaction with the user's own avatar representation.

The configuration (for example, position and/or orientation) of the avatar or parts of the avatar as viewed can be controlled using, for example, the Move controllers 330, by sensing the real positions of the user's hands as in the example of FIG. 6, or by the operation of other user controls. The sensing of the position of the user's hands can be via the camera 1240, which may be a depth camera, and/or via a camera such as a depth camera or one or more cameras 1202 mounted on the HMD and facing forwards with respect to the user wearing the HMD, and/or via one or more sensors 1291 forming part of the haptic interface 1290 (for example, forming part of or built into one or more gloves worn by the user as discussed below) and/or by one or more controls 1210 such as the Move controller mentioned above.

In the virtual environment, the avatar hand 1320 is shown in contact with the display object 1300. Using techniques to be discussed below, so-called haptic sensations can be provided to the user in order to simulate the sensations which would be felt by the avatar hand 1320 touching the display object 1300. The haptic sensations provided to the real user do not have to be an exact representation of how the user would feel if the user were picking up or touching a real version of the display object 1300, but may be sufficient to give, for example, some sensory feedback to the user that the user has touched the display object 1300 in the virtual environment using the virtual avatar hand 1320. Techniques for achieving this will be described below.

FIG. 14 schematically illustrates a haptic glove, with FIGS. 15 and 16 schematically illustrating sensors and actuators forming part of the haptic glove of FIG. 14.

In FIG. 14, the haptic interface comprises one or more actuators attachable to one or both of the user's hands, and comprises one or two gloves to be worn by the user, each glove comprising one or more of the actuators. However, other haptic interfaces could be used, such as a wand or device similar to a Move controller which the user holds and which provides vibration, a Six-Axis® controller, a vibrational floor pad which the user stands on, or the like.

The glove 1400 is worn by the user during operation of the system of FIG. 12 and represents an example of the haptic interface 1290. One glove may be used, or in other example arrangements both hands may wear this type of glove.

Referring to FIGS. 15 and 16, the user's fingers are modelled as a set of portions 1500, 1510, 1520 corresponding to the different joints, knuckles and portions of a real finger, and sensors such as strain gauges which can detect whether they are elongated by virtue of the finger bending are provided at each joint. So, movements of the finger in the directions 1530, 1540 can be detected by the elongation of the strain gauges 1550, 1560, 1570. In this way, the current configuration of the fingers relative to the main part 1580 of the hand can be detected. Similarly, side-to-side movement of a finger such as movement in directions 1600, 1610 in FIG. 16 can be detected by a laterally activated strain gauge 1620. Similar sensors can be provided for one or more fingers and/or the thumb.

Referring to FIG. 17, each of these strain gauges represents a respective sensor in a group of sensors 1700 providing input to a controller 1710 which may form part of the haptic generator 1295 for example.

One or more actuators such as actuators 1590, 1592, 1594 may also be provided as part of the glove 1400.

In this example, the actuator 1590 is provided on the palm of the user's hand when wearing the glove 1400. The actuator 1594 is provided on the tip of the user's finger and the actuator 1592 is provided on the front pad of the user's finger, over the location of the user's fingerprint. The actuators can provide sensory or haptic sensations to the user's hand.

In some examples, the actuators are vibration devices which vibrate in response to an electrical signal received from the controller 1710. Other possibilities are available such as heating devices, devices which provide a mild electrical shock to the nerves on the relevant part of the user's hand, and the like. The actuators are shown generically as a group 1720 in FIG. 17 under the control of the controller 1710.

The sensing arrangement described so far can provide an indication of the configuration of the user's hand as a unit, which is to say the relative position and orientation of the fingers/thumb and the main part of the hand. Another useful piece of information for generating a virtual avatar representation of the hand is its location in space, which is detected by a location detector 1730.

There are various ways in which the location detector can operate. As discussed above, the location detector may comprise one or more cameras 1240, 1202 and appropriate markings and/or illuminations on the glove 1400 to allow the location of the glove to be detected. Indeed, by providing markings and/or illuminations 1410 on one or more fingers, the need for the strain gauges 1550, 1560, 1570 may be reduced or avoided, by detecting the configuration of the fingers optically using the one or more cameras 1240, 1202, from the relative configuration of the markings and/or illuminations in the captured images. In other examples, the glove 1400 may comprise an accelerometer 1420 from which changes in position of the hand may be detected and integrated to provide a current location. In further examples, the glove may provide a wireless beacon from which the current location of the glove can be triangulated by receiving the signals from the beacon (which may indeed provide a data communication wireless connection as well, such as a Bluetooth® wireless connection).

Therefore, various techniques have been described to provide location information from the location detector 1730 and hand configuration information by the sensors 1700. In general, the apparatus may comprise a detector to detect the position and/or orientation of one or both of the user's hands; in which the display generator is configured to generate the virtual representation of the avatar so that the avatar has a configuration dependent upon the detected position and/or orientation detected by the detector. The detector may comprise one or more cameras. The detector may comprise a depth camera.

Figure 18:
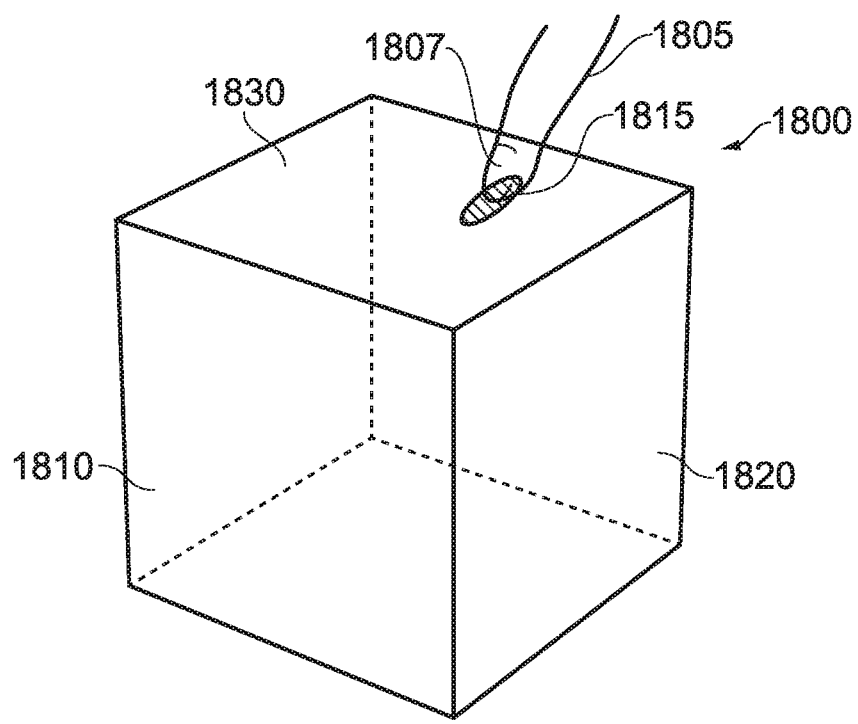
FIG. 18 schematically illustrates a display object.

FIG. 18 schematically illustrates a display object 1800, for example being the display object 1300 of FIG. 13 or another display object. The display object is defined by a 3-dimensional shape in the virtual environment and by its surface appearance. The surface appearance is provided by so-called texture data, for example stored by the storage media 1280 and accessed by the data processor 1220 acting as a display generator, for example as part of an image rendering operation. The texture data is applied to the display object 1800 at each instance of rendering an image containing the display object 1800. Texture data applicable to those portions or faces (in this example) of the display object 1800 which are currently visible, namely a front left face 1810, a front right face 1820 and a top face 1830 in the particular example shown, are used in rendering the object. Other surfaces of the object 1800 which are (in the current rendered frame) hidden or occluded from view, for example by virtue of being at the rear side of the display object 1800 or by virtue of another object being between the object 1800 and the viewer in the virtual environment, do not have their texture data applied, but the texture data still exists in the storage media 1280 for each surface of the display object 1800. The texture data may define the patterning, colour, high frequency detail, surface texture and the like of the surfaces of the display object 1800 for display.

In some examples, the haptic generator 1295 is configured to generate the haptic interaction signal 1295 in dependence upon the graphical texture data applicable to the object. For example, the haptic generator may be configured to detect the avatar (such as an avatar finger 1805) touching the surface of the object at an object contact region 1815 and an avatar contact region 1807, and to generate the haptic interaction signal in dependence upon the graphical texture data applicable to the object contact region.

In some examples, a choice of which (of a plurality of) actuators to actuate by the haptic interaction signal can be made by the haptic generator so as to depend upon which part of the avatar contacts the surface. For example, if the avatar has multiple fingers (such as four fingers and a thumb, but not limited to this) a mapping between avatar fingers and user fingers can be used so that whichever avatar finger or fingers touches the display object, the actuators on the mapped user finger or fingers are actuated. Similarly, if multiple actuators are provided for a single user finger or other hand portion, a choice of which one or more to actuate can be made in dependence upon a mapped portion of the avatar hand touching the display object.

In some examples, this technique can be used to simulate how the user's fingers would feel if the user were to touch a real version of the object 1800, in response to the avatar hand 1320 touching the display object in the virtual environment. In such instances, the user's touch along an outer surface of the display object 1800 is used to determine the state of the haptic interaction signal 1293 provided to the haptic interface 1290.

In other examples, even for a display object 1800 representing a notionally solid object in the virtual environment, it may be possible for the avatar hand 1320 to pass within or through the display object 1800, but in such situations the haptic interaction signal can be generated by the haptic generator to provide at least an indication to the user that the user has caused the avatar hand 1320 to move to an inappropriate internal location with respect to the display object 1800. Techniques for achieving this will be discussed below, but in some examples this can be carried out in dependence upon the graphical texture data applicable to the (outer surfaces of) the object 1800.

Figure 19:
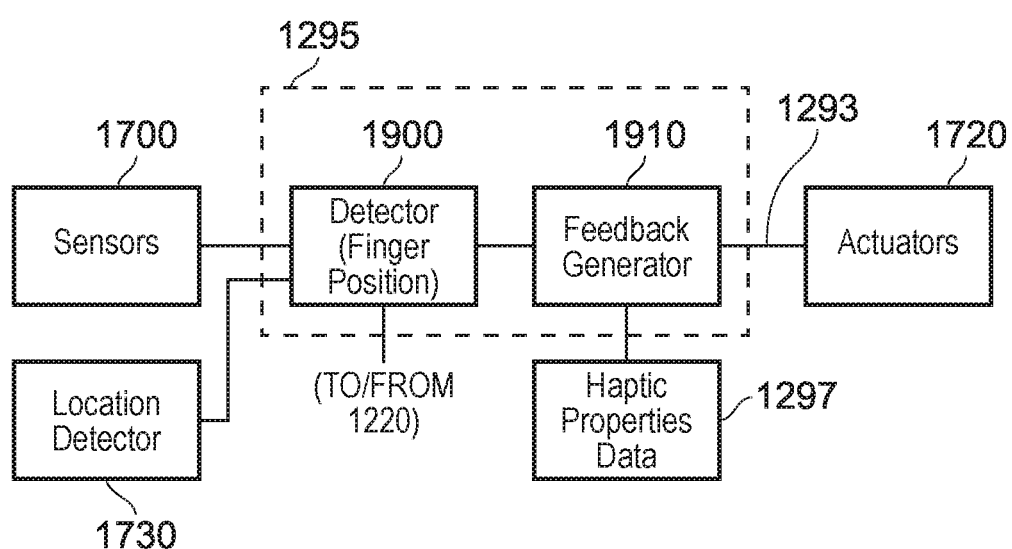
FIG. 19 schematically illustrates example operations of a haptic generator.

FIG. 19 schematically illustrates example operations of a haptic generator such as the haptic generator 1295.

The haptic generator receives inputs from one or more sensors 1700 and from the location detector 1730 and generates the haptic interaction signal 1293 to be provided to the actuators 1720. The haptic generator 1295, including the functions of the controller 1710 of FIG. 17, comprises a detector 1900 to detect a finger position with reference to a display location of the display object 1800 (as received from the data processor 1220) and a feedback generator 1910 which generates the signal 1293 in dependence upon the relative position of the avatar finger and the display object 1800 and also haptic property data 1297.

The derivation of the haptic property data 1297 will now be discussed.

As discussed below, various components of haptic interaction signals can be mixed or otherwise combined using techniques to be discussed. Some examples of sources of these haptic interaction signals are discussed below. These examples can of course be combined in any combination or permutation.

EXAMPLE 1

Haptic Interaction Signal Dependent Upon Interaction Between Avatar and Object

These examples concern a virtual reality apparatus comprising a display generator to generate images of a virtual environment, including a virtual representation of an object and at least part of an avatar, for display to a user; a haptic interface comprising one or more actuators to provide a physical interaction with the user in response to a haptic interaction signal; and a haptic generator to generate the haptic interaction signal in response to a configuration of the avatar relative to the object in the virtual environment.

In some examples, the haptic generator is configured to detect a contact in the virtual environment between an avatar contact region of the avatar at an object contact region with respect to the object; and to associate the object contact region with one or more haptic interaction parameters.

EXAMPLE 2

Haptic Interaction Signal Dependent Upon Detected Motion

For example, the haptic generator may be configured to detect relative motion of the avatar and the object causing a change in the position of the object contact region along a motion path from a first location to a second location with respect to the object; and to generate the haptic interaction signal in response to the motion of the object contact region along the motion path. The motion path may be along a surface of the object, through the interior of the object, or both. For example, the haptic generator may be configured to generate the haptic interaction signal in response to a speed of the object contact region along the motion path. In some examples, the haptic generator may be configured to generate, as the haptic interaction signal, a signal indicative of a vibration having at least one vibrational component which increases in frequency with increasing speed of the object contact region along the motion path, and/or the haptic generator may be configured to generate, as the haptic interaction signal, a signal indicative of a vibration having at least one vibrational component which increases in amplitude with increasing speed of the object contact region along the motion path.

EXAMPLE 3

Haptic Interaction Signal Dependent Upon What Items Are Interacting

In some examples, the haptic generator is configured to generate the haptic interaction signal in dependence upon at least one parameter associated with one or more of:
the object;
the avatar;
the user; and
location of the object contact region with respect to the object.

For example, the at least one parameter may be a parameter of a vibration to be represented by the haptic interaction signal. In some examples, the at least one parameter is indicative of one or both of a base frequency and a base amplitude, the haptic generator being configured to generate the haptic interaction signal by modifying one or both of the base frequency and the base amplitude in response to the detected motion of the object contact region.

EXAMPLE 4

Haptic Interaction Signal Dependent Upon Detected Location

For example, the haptic generator is configured to generate the haptic interaction signal in response to a current location of the object contact region, for example a detected location along the motion path.

EXAMPLE 5

Haptic Interaction Signal Dependent Upon Haptic Texture Data

For example, the haptic generator may be responsive to haptic texture data to define one or more vibrations in dependence upon respective locations of the object contact region with respect to the object. The haptic texture data may map to a 3D location with respect to the interior of the object and/or to a surface location with respect to the object.

EXAMPLE 6

Haptic Interaction Signal Dependent Upon Surface Texture

For example, the haptic generator may be configured to associate the object contact region with one or more surface locations of the object; and to generate the haptic interaction signal in dependence upon haptic texture data applicable to the one or more associated surface locations. The surface texture may be a haptic texture indicative of haptic interaction parameters.

EXAMPLE 7

Haptic Interaction Signal Dependent Upon Surface Graphical Texture

In some examples, the haptic generator may be configured to generate the haptic texture data in response to detected changes in the surface appearance of the object represented by graphical texture data indicative of the surface appearance of the object.

EXAMPLE 8

Haptic Interaction Signal Dependent Upon Audio Signal

Figure 20:
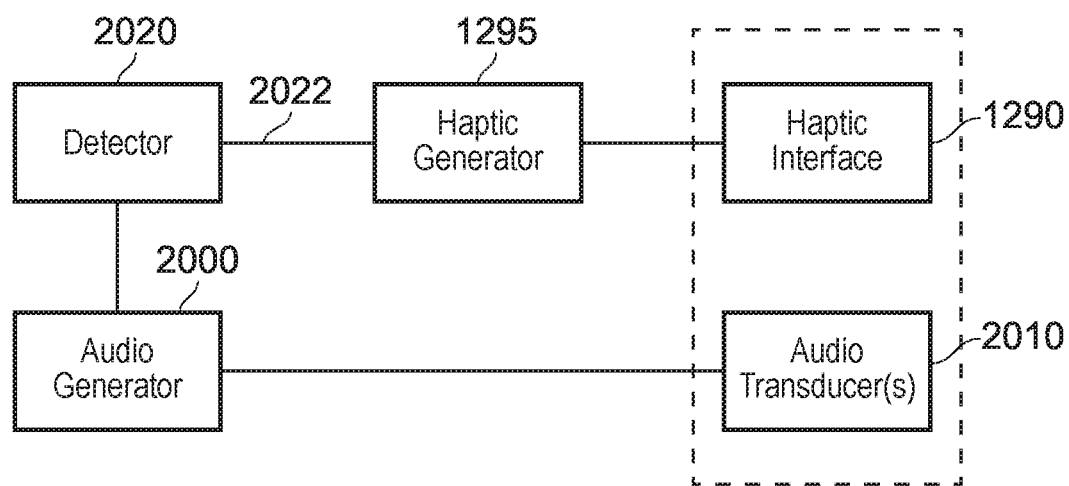
FIG. 20 schematically illustrates example operations of a haptic generator.

Referring to FIG. 20, an audio generator (for example, as part of a game application, for example being implemented by the data processor 1220) supplies audio data or signals to one or more audio transducers 2010, for example one or more earpieces forming part of a headset or HMD. The audio generator also provides audio data, indicative of the audio output being supplied to audio transducers 2010, to a detector 2020. The detector 2020 detects properties of the audio data which may be relevant to the generation of haptic interaction in dependence upon the audio data. For example, these properties may include one or more of:
(a) the frequency content of the audio signal represented by the audio data. In some examples, lower frequency components (for example, below a threshold frequency such as 200 Hz, or components remaining after a weighting function which generally weights lower frequencies more heavily than higher frequencies, has been applied) are detected by the detector 2020 as relevant to the haptic interaction;
(b) the amplitude of the audio signal represented by the audio data. If the amplitude is above a threshold amplitude, or if the amplitude of frequency components (such as low frequency components as discussed above) is above the threshold, then the audio data may be detected by the detector as relevant to the haptic interaction.

If the audio signal is not detected to be relevant to haptic interaction as represented by one or both of these tests, then the haptic generator 1295 is not responsive to the audio data. If it is detected to be relevant then the haptic generator receives an indication 2022 from the detector 2020 as to its relevance and providing an indication of a haptic interaction appropriate to the audio data, for example by the detector 2020 applying a mapping function or mapping data between the frequency and/or amplitude content of the audio data and parameters of a haptic interaction.

In other examples, a detection of relevance (leading to a decision as to whether to initiate is not made, but the detector 2020 operates to extract those components of the audio data from which the haptic generator 1295 may generate a haptic interaction signal (and which may indeed be zero or very small) and passes these as the signal 2022 to the haptic generator.

The haptic generator 1295 generates a haptic interaction signal based on the detection by the detector 2020.

For example, if frequency components of the audio data, having at least a threshold amplitude, are detected below (say) 100 Hz, then a haptic interaction signal for a vibration simulating a rumble can be generated by the haptic generator 1295. One or more frequencies of the vibration can be equal to (or rounded values near to) one or more dominant frequencies of the audio signal in the low frequency range. The amplitude of the vibration can depend on the detected amplitude of the audio signal in the relevant frequency range.

EXAMPLE 9

Haptic Interaction Signal Dependent Upon Object Motion

FIGS. 21-23 will be discussed blow. With regard to the discussion of those figures, a haptic interaction signal can be generated in dependence upon one or more components or aspects of an object's motion.

EXAMPLE 10

Haptic Interaction Signal Dependent Upon a Simulated Propagation Path

Examples will now be described in which a haptic generator generates a haptic interaction signal in response to a configuration of the avatar relative to a display object in the virtual environment. The haptic generator detects an avatar contact region of the avatar touching the object, and generates the haptic interaction signal in dependence upon: (i) simulated haptic interaction (such as a simulated motion) of a second object relative to the display object in the virtual environment; and (ii) a simulated propagation path between the display object and the second object in the virtual environment.

FIGS. 21 and 22 provide simple examples of this arrangement. In FIG. 21, a power drill in the virtual environment (2900) is about to contact a wall 2910. If the avatar hand is holding the drill (2920) then first of all, the haptic interaction signal depends upon the motion of the drill bit relative to the drill body and the propagation path through the drill itself, and then when the drill 2900 touches the wall 2910, the haptic interaction signal depends upon the relative motion of the drill bit and the wall 2910 along with the simulated properties of the propagation path through the drill 2900 to the avatar's hand 2920.

In FIG. 22, an avatar hand 3000 is holding a hammer 3010 which is about to strike a nail 3020. At the time the hammer and nail make contact, the relative motion between the hammer and the nail and the propagation path defined by the hammer determine the interaction signal generated by the haptic generator 1295.

A further example is provided in FIG. 23, in which part of a virtual car is illustrated, in which a road wheel 3100 is travelling along a road 3110 having a rough surface, leading to movement in the virtual environment of the road wheel in a vertical direction 3120. A steering wheel 3130 which the avatar hand is holding, is travelling with the vehicle and so its motion relative to the road wheel in the direction of driving is small or zero, but there is a propagation path defined in part by a virtual steering column or other connections between the road wheel 3100 and the steering wheel 3130 which allows vibrations in the direction 3120 to be transmitted to the steering wheel 3130. So, the relative motion of the road wheel 3100 and the steering wheel 3130 gives rise to the generation of a haptic interaction signal provided to the user whose avatar is holding the virtual steering wheel 3130.

Note that the steering wheel is a display object which the avatar can touch. The road wheel can be simulated but does not need to be currently displayed for the present technique to operate.

FIG. 24 schematically illustrates example operations of a haptic generator, responsive to an object location detector 3200 to detect the location of objects which the avatar may touch such as the steering wheel 3130 in FIG. 23, a detector 3210 to detect the fact that the avatar is touching the relevant object, and a mapped object location detector 3220 to detect the location of a mapped object such as the road wheel 3100 in FIG. 23 on the basis of mapping data 3230 which associates display objects which the avatar may touch with other objects. The mapping data also provides a filter response (such as parameters of a low pass filter function and/or an attenuation or gain-varying function) associating the display object with the mapped object, the filter function simulating a propagation path.

Therefore in examples, the haptic generator is configured to simulate the motion of the second object according to haptic configuration data associated with the second object and/or the location, in the virtual environment, of the second object. The haptic generator may be configured to simulate the propagation path by applying a filtering operation to the simulated haptic interaction of a second object relative to the display object in the virtual environment. The filtering operation may comprise one or both of: a time-based filtering operation; and a gain varying operation; dependent upon path configuration data associated with the simulated propagation path.

In some examples, the haptic generator is configured to detect a degree of contact between the avatar and the display object, and to apply the filtering operation in dependence upon the detected degree of contact. For example, if an avatar fingertip (as a contact region) is touching the steering wheel of FIG. 23, a filtering function having a greater attenuation can be used than in a case where a whole avatar hand is touching the steering wheel.

As well as or instead of mechanical propagation paths and vibrational mapped objects, in other examples the second object may comprise an audio emitter, and the simulated propagation path may comprise an audio propagation path.

The haptic feedback generator 3240 is also responsive to movement such as the movement in the direction 3120 of the mapped object using mapped object haptic data 3250. The haptic feedback generator detects motion of the mapped object, applies the filter function defined by the mapping data, and generates the haptic interaction signal from the result.

Note that "inputs" to the simulated propagation path do not have to relate to motion of another object such as the wheel 3120. They can relate to any haptic interaction appropriate to the other object. Any of the example haptic interactions discussed above in connection with Examples 1-9 can be applicable to this arrangement.

For example, although Examples 1 to 7 as discussed above relate to a contact between an avatar or a portion of an avatar and an object, for the purposes of the use of a simulated propagation path the avatar can be replaced in those examples by the second object.

Similarly, the effect of Example 8 can be an effect on the second object for the purposes of the simulated propagation path.

The arrangement of FIG. 24 can refer to one mapped object, or more than one mapped object. The mapped object haptics 3250 can relate to the motion of that mapped object (Example 9) and/or any of the Examples 1-8.

Therefore, in examples, this arrangement can be one in which one of the haptic detections (to be taken into account in a manner discussed below) comprises a haptic interaction of a second object, and a simulated propagation path between the avatar and the second object in the virtual environment. For example, the haptic interaction of the second object may be relative to the display object in the virtual environment, and the simulated propagation path may be a propagation path between the display object and the second object in the virtual environment.

In a combination of the concepts of Examples 8 and 9, the second object may comprise an audio emitter, and the simulated propagation path may comprise an audio propagation path.

In the examples of FIGS. 21-23, the haptic interaction of the second object comprises a simulated motion of the second object.

In example embodiments such as those discussed with respect to FIGS. 21-24, the haptic generator can be configured to simulate the motion of the second object according to haptic configuration data associated with the second object and/or the location, in the virtual environment, of the second object. The haptic generator may be configured to simulate the propagation path by applying a filtering operation to the haptic interaction of the second object. The filtering operation may comprise one or both of: a time-based filtering operation; and a gain varying operation; dependent upon path configuration data associated with the simulated propagation path.

Mixing of Haptic Interaction Signals

The detectors discussed above represent examples of a detector arrangement configured to detect two or more haptic detections applicable to a current configuration of the avatar relative to the object in the virtual environment.

In example embodiments, a haptic generator generates the haptic interaction signal in dependence upon the two or more haptic detections.

FIG. 25 schematically illustrates example operations of a haptics generator in which, in response to location data 3300, a so-called active haptics generator acts in the fashion of FIG. 32 (3310) and a so-called passive haptics generator 3320 acts in the manner of FIG. 19 to generate collectively a combined haptic interaction signal 1293.

In this way the apparatus acts as a detector arrangement configured to detect two or more haptic detections applicable to a current configuration of the avatar relative to the object in the virtual environment; and a haptic generator to generate the haptic interaction signal in dependence upon the two or more haptic detections.

In doing so, the haptic generator can incorporate and make use of a mixer 3400 of FIG. 4 which mixes input vibration data 3410 received from:

(a) multiple instances of the haptics generator 1295; and/or (b) the active and passive haptics generators of FIG. 25.

Alternatively, a mixing process can be carried out by the haptics generator itself, in that it generates a single haptic interaction signal in response to multiple influences or input data.

The haptic detections combined by this mixing arrangement can comprise detections selected from the list consisting of:

a detection of an audio signal for provision to the user (Example 8);

a detection of contact between at least a part of the avatar and at least a part of the surface of the display object (Example 1);

a detection of motion of a contact region between at least a part of the avatar and at least a part of the surface of the display object (Example 2)

a detection of contact between at least a part of the avatar and at least a part of the interior of the display object (Examples 1 and 4);

a detection of motion of a contact region between at least a part of the avatar and at least a part of the interior of the display object (Examples 2 and 4); and and a detection of simulated motion of the display object (Example 9).

In some examples, the mixer function 3400 can be responsive to data 3410 indicative or properties of the haptic interface in use by the user (for example, from configuration and/or handshake data relating to that haptic interface), to vary the mixing process according to those properties. For example, if the haptic interface in use is capable of a greater frequency range and/or amplitude of vibration, the mixing process could be arranged to apply a greater mixing emphasis to signals having higher frequency and/or amplitude components, and/or the mixing process could be arranged to allow an output haptic interaction signal indicative of a higher frequency and/or amplitude range.

The apparatus described above also provides an example of virtual reality apparatus comprising: a display generator to generate images of a virtual environment, including a virtual representation of a display object and at least part of an avatar, for display to a user;

a haptic interface comprising one or more actuators to provide a physical interaction with the user in response to a haptic interaction signal; and a haptic generator to generate the haptic interaction signal in response to a configuration of the avatar relative to the object in the virtual environment;

in which the haptic generator is configured to detect an avatar contact region of the avatar touching the object, and generate the haptic interaction signal in dependence upon:

simulated haptic interaction of a second object relative to the display object in the virtual environment; and a simulated propagation path between the display object and the second object in the virtual environment.

Apparatus Connectable to a Haptic Interface

These techniques can also be embodied by a virtual reality apparatus comprising:

a display generator to generate images of a virtual environment, including a virtual representation of a display object and at least part of an avatar, for display to a user;

a detector arrangement configured to detect two or more haptic detections applicable to a current configuration of the avatar relative to the object in the virtual environment; and a haptic generator to generate a haptic interaction signal, to control a haptic interface comprising one or more actuators to provide a physical interaction with the user in response to a haptic interaction signal, in dependence upon the two or more haptic detections.

These techniques can also be embodied by a virtual reality apparatus comprising:

a display generator to generate images of a virtual environment, including a virtual representation of a display object and at least part of an avatar, for display to a user;

a haptic generator to generate the haptic interaction signal in response to a configuration of the avatar relative to the object in the virtual environment;

in which the haptic generator is configured to detect an avatar contact region of the avatar touching the object, and generate the haptic interaction signal in dependence upon:

simulated haptic interaction of a second object relative to the display object in the virtual environment; and a simulated propagation path between the display object and the second object in the virtual environment.

Corresponding Methods

Figure 27:
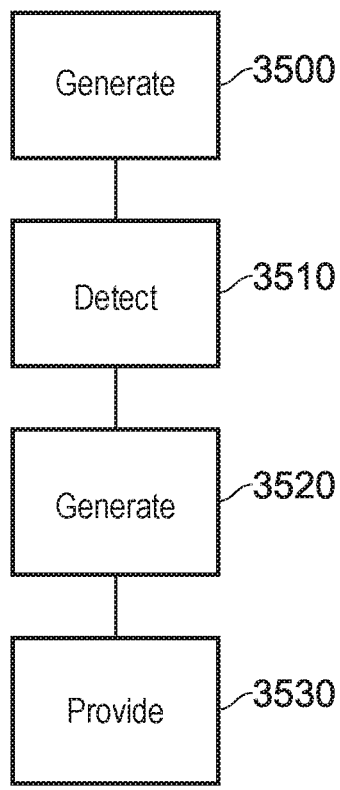
FIGS. 27 to 29 schematically illustrate respective methods.

FIG. 27 is a schematic flowchart illustrating a method comprising:

generating (at a step 3500) images of a virtual environment, including a virtual representation of a display object and at least part of an avatar, for display to a user;

detecting (at a step 3510) two or more haptic detections applicable to a current configuration of the avatar relative to the object in the virtual environment;

generating (at a step 3520) a haptic interaction signal in dependence upon the two or more haptic detections; and providing (at a step 3530), by a haptic interface comprising one or more actuators, a physical interaction with the user in response to a haptic interaction signal.

Figure 28:
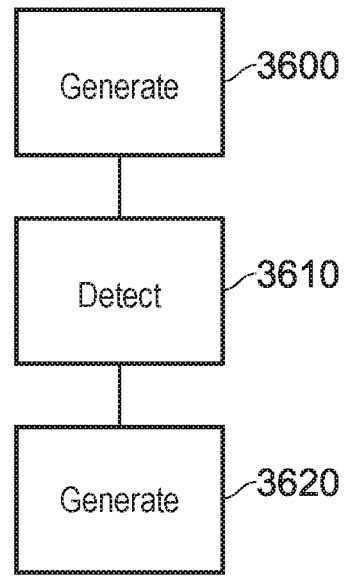

FIG. 28 is a schematic flowchart illustrating a method comprising:

generating (at a step 3600) images of a virtual environment, including a virtual representation of a display object and at least part of an avatar, for display to a user;

detecting (at a step 3610) two or more haptic detections applicable to a current configuration of the avatar relative to the object in the virtual environment; and generating (at a step 3620) a haptic interaction signal, to control a haptic interface comprising one or more actuators to provide a physical interaction with the user in response to a haptic interaction signal, in dependence upon the two or more haptic detections.

Figure 29:
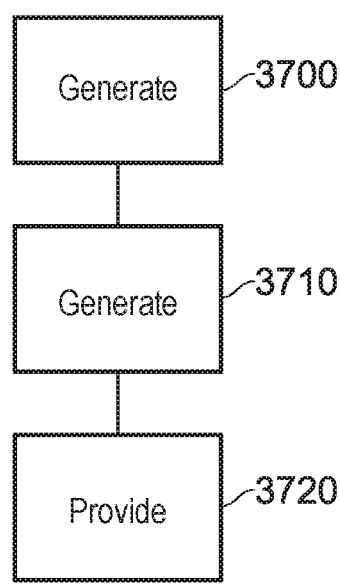

FIG. 29 is a schematic flowchart illustrating a method comprising:

generating (at a step 3700) images of a virtual environment, including a virtual representation of a display object and at least part of an avatar, for display to a user;

generating (at a step 3710) a haptic interaction signal in response to a configuration of the avatar relative to the object in the virtual environment, by detecting an avatar contact region of the avatar touching the object, and generating the haptic interaction signal in dependence upon:

simulated haptic interaction of a second object in the virtual environment; and a simulated propagation path between the display object and the second object in the virtual environment; and (optionally) providing (at a step 3720) a physical interaction with the user in response to a haptic interaction signal.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

The invention claimed is:

1. An apparatus comprising:
a display generator to generate images of a virtual environment, including a virtual representation of a display object and at least part of an avatar, for display to a user;
a haptic interface comprising one or more actuators to provide a physical interaction with the user in response to a haptic interaction signal;
a detector arrangement configured to detect two or more haptic detections applicable to a current configuration of the avatar relative to the object in the virtual environment; and
a haptic generator to generate the haptic interaction signal in dependence upon the two or more haptic detections, wherein:
one of the haptic detections comprises a haptic interaction of a second object and a simulated propagation path between the avatar and the second object in the virtual environment, and
the haptic generator is configured to simulate the propagation path by applying a filtering operation to the haptic interaction of the second object.

2. The apparatus according to claim 1, in which the haptic interaction of the second object is relative to the display object in the virtual environment, and the simulated propagation path is a propagation path between the display object and the second object in the virtual environment.

3. The apparatus according to claim 1, in which the second object comprises an audio emitter, and the simulated propagation path comprises an audio propagation path.

4. The apparatus according to claim 1, in which the haptic interaction of the second object comprises a simulated motion of the second object.

5. The apparatus according to claim 4, in which the haptic generator is configured to simulate the motion of the second object according to haptic configuration data associated with the second object and/or the location, in the virtual environment, of the second object.

6. The apparatus according to claim 1, in which the filtering operation comprises one or both of:
a time-based filtering operation; and
a gain varying operation;
dependent upon path configuration data associated with the simulated propagation path.

7. The apparatus according to claim 6, in which the haptic generator is configured to detect a degree of contact between the avatar and the display object, and to apply the filtering operation in dependence upon the detected degree of contact.

8. The apparatus according to claim 1, in which the haptic detections comprise detections selected from the list consisting of:
a detection of an audio signal for provision to the user;
a detection of contact between at least a part of the avatar and at least a part of the surface of the display object;
a detection of motion of a contact region between at least a part of the avatar and at least a part of the surface of the display object;
a detection of contact between at least a part of the avatar and at least a part of the interior of the display object;
a detection of motion of a contact region between at least a part of the avatar and at least a part of the interior of the display object; and
a detection of simulated motion of the display object.

9. The apparatus according to claim 8, in which:
the avatar is a representation of a body having one or more limbs; and
an avatar contact region for contact with the display object is disposed at or near an extremity of one or more of the limbs.

10. The apparatus according to claim 1, comprising a head mountable display (HMD) to display the images of the virtual environment to the user.

11. The apparatus according to claim 1, in which the haptic generator is responsive to attributes defining one or capabilities of the haptic interface.

12. The apparatus according to claim 11, in which an attribute defines a frequency response of the haptic interface.

13. The apparatus according to claim 11, in which an attribute defines a maximum amplitude which may be represented by the haptic interface.

14. The apparatus according to claim 1, in which the haptic interface comprises one or more actuators attachable to one or both of the user's hands.

15. The apparatus according to claim 14, comprising one or two gloves to be worn by the user, each glove comprising one or more of the actuators.

16. The apparatus according to claim 1, comprising:
a detector to detect the position and/or orientation of one or both of the user's hands;
in which the display generator is configured to generate the virtual representation of the avatar so that the avatar has a configuration dependent upon the detected position and/or orientation detected by the detector.

17. The apparatus according to claim 16, in which the detector comprises one or more cameras.

18. The apparatus according to claim 17, in which the detector comprises a depth camera.

19. An apparatus comprising:
a display generator to generate images of a virtual environment, including a virtual representation of a display object and at least part of an avatar, for display to a user;
a detector arrangement configured to detect two or more haptic detections applicable to a current configuration of the avatar relative to the object in the virtual environment; and
a haptic generator to generate a haptic interaction signal, to control a haptic interface comprising one or more actuators to provide a physical interaction with the user in response to a haptic interaction signal, in dependence upon the two or more haptic detections, wherein:
one of the haptic detections comprises a haptic interaction of a second object and a simulated propagation path between the avatar and the second object in the virtual environment, and
the haptic generator is configured to simulate the propagation path by applying a filtering operation to the haptic interaction of the second object.

20. An apparatus comprising:
a display generator to generate images of a virtual environment, including a virtual representation of a display object and at least part of an avatar, for display to a user;
a haptic interface comprising one or more actuators to provide a physical interaction with the user in response to a haptic interaction signal; and
a haptic generator to generate the haptic interaction signal in response to a configuration of the avatar relative to the object in the virtual environment;
in which the haptic generator is configured to detect an avatar contact region of the avatar touching the object, and generate the haptic interaction signal in dependence upon:
simulated haptic interaction of a second object relative to the display object in the virtual environment; and
a simulated propagation path between the display object and the second object in the virtual environment,
wherein the haptic generator is configured to simulate the propagation path by applying a filtering operation to the haptic interaction of the second object.

21. An apparatus comprising:
a display generator to generate images of a virtual environment, including a virtual representation of a display object and at least part of an avatar, for display to a user;
a haptic generator to generate the haptic interaction signal in response to a configuration of the avatar relative to the object in the virtual environment;
in which the haptic generator is configured to detect an avatar contact region of the avatar touching the object, and generate the haptic interaction signal in dependence upon:
simulated haptic interaction of a second object relative to the display object in the virtual environment; and
a simulated propagation path between the display object and the second object in the virtual environment,
wherein the haptic generator is configured to simulate the propagation path by applying a filtering operation to the haptic interaction of the second object.

22. A method comprising:
generating images of a virtual environment, including a virtual representation of a display object and at least part of an avatar, for display to a user;
detecting two or more haptic detections applicable to a current configuration of the avatar relative to the object in the virtual environment;
generating a haptic interaction signal in dependence upon the two or more haptic detections; and
providing, by a haptic interface comprising one or more actuators, a physical interaction with the user in response to a haptic interaction signal, wherein:
one of the haptic detections comprises a haptic interaction of a second object and a simulated propagation path between the avatar and the second object in the virtual environment, and the generating includes simulating the propagation path by applying a filtering operation to the haptic interaction of the second object.

23. A method comprising:
generating images of a virtual environment, including a virtual representation of a display object and at least part of an avatar, for display to a user;
detecting two or more haptic detections applicable to a current configuration of the avatar relative to the object in the virtual environment; and
generating a haptic interaction signal, to control a haptic interface comprising one or more actuators to provide a physical interaction with the user in response to a haptic interaction signal, in dependence upon the two or more haptic detections, wherein:
one of the haptic detections comprises a haptic interaction of a second object and a simulated propagation path between the avatar and the second object in the virtual environment, and
the generating includes simulating the propagation path by applying a filtering operation to the haptic interaction of the second object.

24. A method comprising:
generating images of a virtual environment, including a virtual representation of a display object and at least part of an avatar, for display to a user;
generating a haptic interaction signal in response to a configuration of the avatar relative to the object in the virtual environment, by detecting an avatar contact region of the avatar touching the object, and generating the haptic interaction signal in dependence upon:
simulated haptic interaction of a second object in the virtual environment; and
a simulated propagation path between the display object and the second object in the virtual environment; and
providing a physical interaction with the user in response to a haptic interaction signal
wherein the generating includes simulating the propagation path by applying a filtering operation to the haptic interaction of the second object.

25. A method comprising:
generating images of a virtual environment, including a virtual representation of a display object and at least part of an avatar, for display to a user; and
generating a haptic interaction signal in response to a configuration of the avatar relative to the object in the virtual environment, by detecting an avatar contact region of the avatar touching the object, and generating the haptic interaction signal in dependence upon:
simulated haptic interaction of a second object in the virtual environment; and
a simulated propagation path between the display object and the second object in the virtual environment
wherein the generating includes simulating the propagation path by applying a filtering operation to the haptic interaction of the second object.

* * * * *